US010055904B2

United States Patent
Miller et al.

(10) Patent No.: US 10,055,904 B2
(45) Date of Patent: Aug. 21, 2018

(54) VEHICLE GATEWAY NETWORK PROTECTION

(71) Applicant: Ford Global Technologies, LLC, Dearborn, MI (US)

(72) Inventors: Jason Michael Miller, Woodhaven, MI (US); John Russell Bielawski, Jr., Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/190,911

(22) Filed: Jun. 23, 2016

(65) Prior Publication Data

US 2017/0372535 A1    Dec. 28, 2017

(51) Int. Cl.
*G07C 5/08* (2006.01)
*G07C 5/02* (2006.01)
*G07C 5/00* (2006.01)
*H04L 29/08* (2006.01)

(52) U.S. Cl.
CPC .......... *G07C 5/0808* (2013.01); *G07C 5/02* (2013.01); *G07C 5/008* (2013.01); *H04L 67/00* (2013.01)

(58) Field of Classification Search
None
See application file for complete search history.

(56) References Cited

U.S. PATENT DOCUMENTS

| | | | |
|---|---|---|---|
| 2013/0345903 | A1 | 12/2013 | Nakagawa |
| 2014/0213238 | A1* | 7/2014 | Giraud .................. G07C 5/008 455/418 |
| 2014/0350772 | A1 | 11/2014 | Saito |
| 2014/0365067 | A1 | 12/2014 | Kwon et al. |
| 2017/0111183 | A1 | 4/2017 | Kojima |

FOREIGN PATENT DOCUMENTS

| | | |
|---|---|---|
| CN | 103117920 A | 5/2013 |
| CN | 103616830 A | 3/2014 |
| EP | 1662714 | 5/2006 |

OTHER PUBLICATIONS

Search Report dated Nov. 29, 2017 for GB Patent Application No. GB1709879.9 (3 Pages).

* cited by examiner

*Primary Examiner* — Mussa A Shaawat
*Assistant Examiner* — Kyung J Kim
(74) *Attorney, Agent, or Firm* — James P. Muraff; Neal, Gerber & Eisenberg LLP (57) ABSTRACT

Example systems and method are disclosed for vehicle network gateway protection. An example disclosed method to protect a vehicle includes managing state transitions of a gateway separating a telematic dongle and a vehicle data bus. The example method also includes, when the gateway is in a field state, blocking first requests from the telematic dongle. Additionally, the example method includes, in response to the gateway transitioning to the field state, blocking the first requests and second requests from the telematic dongle for a period of time.

18 Claims, 4 Drawing Sheets

VEHICLE GATEWAY NETWORK PROTECTION

TECHNICAL FIELD

The present disclosure generally relates to a vehicle data bus and, more specifically, vehicle gateway network protection.

BACKGROUND

Modern vehicles include one or more data buses that facilitate communication between electronic control units (ECUs) that monitor and control various vehicle subsystems. On-board diagnostics (OBD) facilitate the ECUs performing diagnostics and reporting the results via the data buses. Vehicles include connectors, such as OBD-II connectors, that allow external diagnostic tools to be coupled to the vehicle data buses to interact with the diagnostics of the ECUs. For example, a vehicle repair facility may connect to the OBD-II port to obtain information to determine why an engine check light is illuminated.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are disclosed for vehicle network gateway protection. An example disclosed method to protect a vehicle includes managing state transitions of a gateway separating a telematic dongle and a vehicle data bus. The example method also includes, when the gateway is in a field state, blocking first requests from the telematic dongle. Additionally, the example method includes, in response to the gateway transitioning to the field state, blocking the first requests and second requests from the telematic dongle for a period of time.

An example system to protect a vehicle includes non-volatile protected memory and a state arbiter. The example non-volatile protected memory stores a value indicative of a state. The example state arbiter manages state transitions of a gateway separating a telematic dongle and a vehicle data bus. The example session arbiter also, when the gateway is in a field state, blocks first requests from the telematic dongle. In response to the gateway transitioning to the field state, the example session arbiter blocks the first requests and second requests from the telematic dongle for a period of time.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

Increasingly, aftermarket telematic control units (TCUs) are available for a variety of purposes. As used herein, TCUs are sometimes referred to as "telematic dongles." The TCUs plug into the diagnostic port (e.g. the OBD-II port, etc.) to access the diagnostic routines of electronic control units (ECUs) that monitor and control various vehicle subsystems. For example, some TCUs are offered by insurance companies to track driving habits and price insurance accordingly. These TCUs include software and hardware to (a) communicate with the ECUs over the vehicle data bus, and (b) often have hardware to connect (e.g., via a cellular network, via a Bluetooth® connection, via a wireless local area connection, etc) to an external network to communicate the diagnostic information. However, the TCU can create vulnerabilities that allow unanticipated and/or unauthorized access to features of the ECUs. For example, a third-party TCU purchased on an online marketplace may malfunction or be remotely controlled to utilize the diagnostic requests to facilitate unauthorized control of the subsystems of the vehicle via the ECUs. As another example, when the vehicle is locked and its perimeter alarm is armed, a poorly programmed third-party TCU may allow access to a body control unit, which is an ECU that controls the door locks and the perimeter alarm. As used herein, the term third-party refers to a manufacturer other than the manufacturer of the vehicle in which the TCU is installed.

ECUs on the vehicle support different diagnostic sessions (e.g. a default session, an extended diagnostic session, and a programming session, etc.) that allow different diagnostic functions to be accessed. As disclosed in more detail below, the gateway ECU (sometimes referred to as the "gateway" herein) supports different operating states to help prevent ECUs from receiving sensitive diagnostic requests during non-ideal times. The gateway states include (a) a field state, (b) a sensitive diagnostic state, and (c) a transition state. The field state is the default state when the vehicle is operating. In some examples, the gateway is in the field state when it is in motion over five kilometers per hour (kph). Sensitive diagnostic requests (such as requests to transition ECUs to a different diagnostic session, ECU reset requests, etc.) are blocked when the gateway is in the field state. Transitions to the field state while the vehicle is in motion do not create an unsafe condition. However, allowing access to certain sensitive diagnostic functions while the vehicle is in motion may cause the vehicle to exhibit undesired behavior. Placing the gateway into the sensitive diagnostic state allows the sensitive diagnostic requests to be forwarded onto the internal vehicle networks. In most circumstances, the vehicle is not in motion when the gateway is in the sensitive diagnostic state. The transition state facilitates the vehicle determining which state (e.g., the field state or the sensitive diagnostic state) it should enter after an ignition of the vehicle is switched to on. Any sensitive diagnostic requests are also blocked when the gateway is in the transition state A gateway is communicatively coupled between an ingress point into the data buses (e.g., the ODB-II port) and the vehicle data buses. As such, the gateway separates the TCU from the vehicle data buses. The gateway controls requests to transition the ECUs into different sessions. For example, the gateway allows or blocks requests to transition to a different session from reaching the ECUs. Diagnostic requests may take time to process by the ECUs. As such, some ECUs may be processing the diagnostic requests when the session transitions from, for example, the diagnostic session to the default session. As described herein, the gateway blocks access to sensitive diagnostic requests when the gateway is the field state. Additionally, as described here, the gateway blocks diagnostic requests for a period of time (e.g., ten seconds) after transitioning from the sensitive diagnostic state to the field state so that the ECUs transition to the default session before processing more diagnostic requests.

Figure 1:
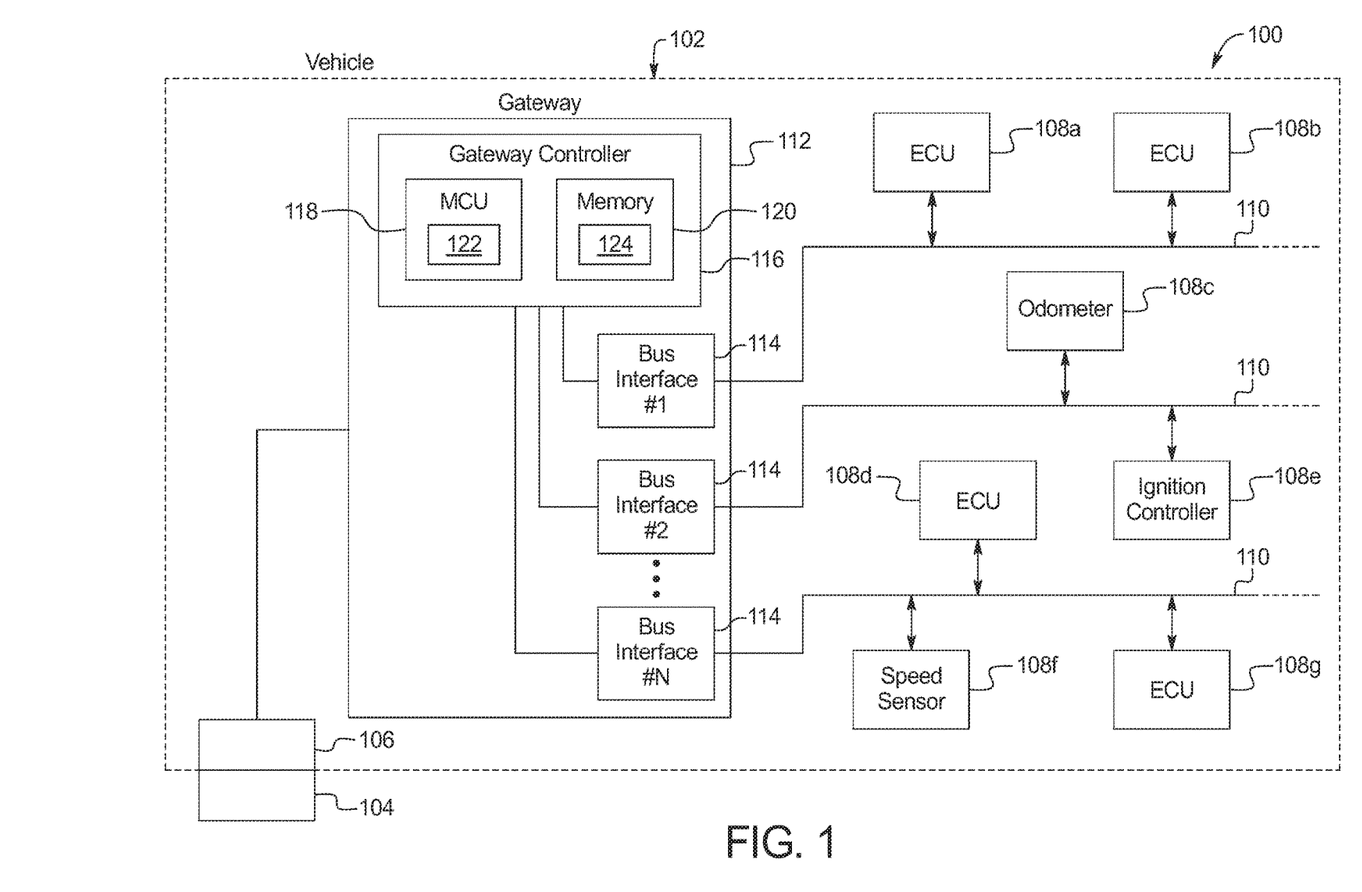
FIG. 1 is a block diagram of a vehicle gateway network protection system that operates in accordance with the teachings of this disclosure.

FIG. 1 is a block diagram of a vehicle gateway network protection system 100 of a vehicle 102 that operates in accordance with the teachings of this disclosure. In the illustrated example, a telematic control unit (TCU) 104 is plugged into a diagnostic port 106 of the vehicle 102. The vehicle 102 may be a standard gasoline powered vehicle, a hybrid vehicle, an electric vehicle, a fuel cell vehicle, or any other mobility implement type of vehicle. The vehicle 102 may be non-autonomous, semi-autonomous, or autonomous. The vehicle 102 includes parts related to mobility, such as a powertrain with an engine, a transmission, a suspension, a driveshaft, and/or wheels, etc. In the illustrated example, the vehicle 102 includes the diagnostic port 106, electronic control units (ECUs) 108a-108g, one or more vehicle data buses 110, and a gateway 112.

The TCU 104 is a device with hardware and software to communicate with the ECUs 108a-108g. In some examples, the TCU 104 includes hardware and software to connect to another device (e.g., a smart phone, a tablet, a laptop, a diagnostic tool, etc.) or an external network (e.g., the Internet, a private intranet, etc.) via a wired (e.g., universal serial bus (USB), Firewire (IEEE 1394), etc.) or wireless (e.g., a wireless local area network, a cellular network, a Bluetooth® network, near field communication (NFC), etc.) connection. The TCU 104 issues diagnostic requests to the ECU(s) 110a-110g. Additionally, the TCU 104 receives the diagnostic information from the ECU(s) 110a-110g via the vehicle data buses 110.

The diagnostic port 106 is a connector configured to receive, for example, a cable or a TCU 104. In some examples, the diagnostic port 106 is implemented in accordance with the On-Board Diagnostic II (OBD-II) specification (e.g., SAE J1962 and SAE J1850) maintained by the Society of Automotive Engineers (SAE). In some examples, the diagnostic port 106 is under or near an instrument panel cluster of the vehicle 102.

The ECUs 108a-108g monitor and control the subsystems of the vehicle 102. The ECUs 108a-108g communicate properties (such as, status of the ECU 108a-108g, sensor readings, control state, error and diagnostic codes, etc.) and/or receive requests from other ECUs 108a-108g and/or the TCU 104 via the vehicle data buses 110. Some vehicles 102 may have seventy or more ECUs 108a-108g located in various locations around the vehicle 102 communicatively coupled by the vehicle data buses 110. The ECUs 108a-108g are discrete sets of electronics that include their own circuit(s) (such as integrated circuits, microprocessors, memory, storage, etc.) and firmware, sensors, actuators, and/or mounting hardware. In the illustrated example, the ECUs 108a-108g include an odometer 108c, an ignition control 108e, and a speed sensor 108f. The odometer 108c monitors the distance traveled by the vehicle 102. The ignition control 108e monitors the position of an ignition switch. The speed sensor 108f monitors the speed of the vehicle 102. In some examples, the speed sensor 108f may include one or more wheel speed sensors and/or an axel speed sensor.

The ECUs 108a-108g have diagnostic capabilities. The diagnostic abilities include, for example, (a) reporting status and sensor information, (b) rebooting the ECU 108a-108g, and (c) test connections to the related subsystem. For example, a body control ECU may report the status of the headlights, test the headlights (e.g., cause the headlights cycle in a specific pattern), and/or reset (which may cause the headlights to turn off while the body control ECU reboots.). In response to a diagnostic request (e.g., from the TCU 104), the ECUs 108a-108g perform the requested diagnostic routine. Based on the capabilities of the ECUs 108a-108g and the complexity of the requested diagnostic routine, the diagnostic requests may take time for the ECUs 108a-108g to process. In some examples, the ECUs 108a-108g respond differently in different sessions. In some such examples, the ECUs 108a-108g may respond to rebooting requests or connection test requests when the ECU 108a-108g is in the extended diagnostic session, but not when the ECU 108a-108g is in the default session.

The vehicle data buses 110 communicatively couple the ECUs 108a-108g. The ECUs 108a-108g may be organized on separate vehicle data buses 110 to manage, for example, safety, data congestion, data management, etc. For example, the sensitive ECUs 108a-108g (e.g., the brake control unit, the engine control unit, etc.) may be on a separate bus from the other ECUs 108a-108g (e.g., the body control unit, the infotainment head unit, etc.). The TCU 104 communicates to the ECUs 108a-108g via the vehicle data buses when the TCU 104 is plugged into the diagnostic port 106. The vehicle data buses 110 may be implemented in accordance with a controller area network (CAN) bus protocol as defined by International Standards Organization (ISO) 11898-1, a Media Oriented Systems Transport (MOST) bus protocol, a CAN flexible data (CAN-FD) bus protocol (ISO 11898-7) and/a K-line bus protocol (ISO 9141 and ISO 14230-1), and/or an Ethernet bus protocol, etc.

The gateway 112 facilitates communication between the ECUs 108a-108g on the different vehicle data buses 110. Additionally, the gateway 112 arbitrates communication between the TCU 104 and the ECUs 108a-108g. In the illustrated example, the gateway 112 includes the bus interfaces 114 and the gateway controller 116. The bus interfaces 114 include hardware and firmware to communicate with the vehicle data buses 110.

In the illustrated example, the gateway controller 116 includes a processor or controller 118, memory 120, and a session arbiter 122. The processor or controller 118 may be any suitable processing device or set of processing devices such as, but not limited to: a microprocessor, a microcontroller-based platform, a suitable integrated circuit, one or more application-specific integrated circuits (ASICs) and/or one or more field programmable gate arrays (FPGAs). In the illustrated example, the processor or controller 118 is structured to include the session arbiter 122. The memory 120 may be volatile memory (e.g., RAM, which can include non-volatile RAM, magnetic RAM, ferroelectric RAM, and any other suitable forms); non-volatile memory (e.g., disk memory, FLASH memory, EPROMs, EEPROMs, memristor-based non-volatile solid-state memory, etc.), unalterable memory (e.g., EPROMs), and read-only memory. In some examples, the memory 120 includes multiple kinds of memory, particularly volatile memory and non-volatile memory. The memory 120 may also include any high-capacity storage device, such as a hard drive, and/or a solid state drive. In the illustrated example, the memory 120 includes non-volatile protected memory 124.

The memory 120 is a computer readable medium on which one or more sets of instructions, such as the software for operating the methods of the present disclosure can be embedded. The instructions may embody one or more of the methods or logic as described herein. In a particular embodiment, the instructions may reside completely, or at least partially, within any one or more of the memory 120, the computer readable medium, and/or within the processor 118 during execution of the instructions.

The terms "non-transitory computer-readable medium" and "computer-readable medium" should be understood to include a single medium or multiple media, such as a centralized or distributed database, and/or associated caches and servers that store one or more sets of instructions. The terms "non-transitory computer-readable medium" and "computer-readable medium" also include any tangible medium that is capable of storing, encoding or carrying a set of instructions for execution by a processor, or that cause a system to perform any one or more of the methods or operations disclosed herein. As used herein, the term "computer readable medium" is expressly defined to include any type of computer readable storage device and/or storage disk and to exclude propagating signals The session arbiter 122 manages (i) a feature status, (ii) a stop trigger and a start trigger, and (iii) the states of the gateway 112. The feature status is a binary value (e.g., enabled or disabled) that controls sensitive diagnostic requests reaching the ECUs 108a-108g. The session arbiter 122 stores a value representative of feature status into the non-volatile protected memory 124 so that the session arbiter 122 maintains the current feature status of the gateway 112 through a power-loss event. When the session arbiter 122 is to determine the feature status the gateway 112, the session arbiter 122 uses the value in the non-volatile protected memory 124. Additionally, session arbiter 122 does not change the value representative of the current feature status written to the non-volatile protected memory 124 to disabled until after a secure authentication handshake using, in some examples, a seed/key process. In some examples, diagnostic tools request to change the feature status from enabled to disabled. To do so, in such examples, the diagnostic tools include an authenticator to handshake with the gateway 112. For example, the diagnostic tools may calculate an unlock key to the gateway controller 116 directly from the gateway controller 116 issued seed. As another example, the diagnostic tools may calculate the unlock key to the gateway controller 116 by connecting to a secure online database that stores authentication seeds that are unique to the particular gateway controller 116 based on a identifier of the particular gateway controller 116. Conversely, the session arbiter 122 may write the value representative of enabled into the non-volatile protected memory 124 without authentication when feature status is disabled. If an invalid value (e.g., a value not associated with enabled or disabled) is in the non-volatile protected memory 124, the session arbiter 122 writes the value indicative of the feature status being enabled into the non-volatile protected memory 124.

In some examples, the session arbiter 122 maintains a feature status timer that is set when the feature status is changed from enabled to disabled. In such examples, when the feature status timer expires, the session arbiter 122 sets the value in the non-volatile protected memory 124 to enabled. The feature status timer may be time-based (e.g., five minutes, ten minutes, an hour, etc.), ignition cycle-based (e.g., two ignition cycles, ten ignition cycles, etc.), or mileage-based (e.g., ten miles, twenty miles, etc.). For example, if the feature status timer is time-based, the session arbiter 122 may sets the value in the non-volatile protected memory 124 to enabled after thirty minutes have elapsed.

The start trigger is enabled the vehicle 102 is being driven. In some examples, the start trigger is enabled when a speed of the vehicle 102 satisfies (e.g., is greater than or equal to) a speed threshold. Conversely, in such examples, the speed trigger is disabled when the speed of the vehicle 102 does not satisfy the speed threshold. In some such examples, the speed threshold is 5 kph. The stop trigger is enabled when the vehicle is not being driven. In some examples, the stop trigger is enabled when the ignition switch is in (e.g., physically or logically) the ACC position or the OFF position. Conversely, in such examples, the stop trigger is disabled when the ignition switch is in (e.g., physically or logically) in the ON position.

As discussed in more detail below in connection with FIGS. 2 and 3, the session arbiter 122 monitors diagnostic requests made by the TCU 104 and blocks certain diagnostic requests based on the current state of the gateway 112. The example states of the session arbiter 122 include {transition, field, diagnostic}. The session arbiter 122 monitors the diagnostic requests sent by the TCU 104. The session arbiter 122 blocks sensitive diagnostic requests (e.g., session transition diagnostic requests, reset diagnostic requests, etc.) when the gateway 112 is in the field state or the transition state. In the field state or the transition state, the session arbiter 122 forwards non-sensitive diagnostic requests (e.g., information gathering requests, etc.) from the TCU 104 to the requested vehicle data bus 110. When the gateway 112 is in a state other than the field state or the transition state (e.g., the diagnostic state), the session arbiter 122 forwards the diagnostic requests (e.g. sensitive and non-sensitive) from the TCU 104 to the requested vehicle data bus 110. Additionally, after the state of the gateway 112 transitions into the field state from another state, the session arbiter 122 blocks all diagnostic requests for a period of time (e.g., five seconds, ten seconds, etc.).

In some examples, the session arbiter 122 recognizes a manufacture context and/or an extended diagnostic context. When the diagnostic tool requests that the feature status be set to disabled, the diagnostic tool may also include one of the contexts. The contexts specify conditions in which the session arbiter 122 is to set the feature status back to enabled. In such examples, the session arbiter 122 tracks a timeout condition. When the timeout condition is satisfied, the session arbiter 122 sets the feature status to enabled. In the extended service context, the timeout condition is a threshold number of ignition cycles (e.g., the ignition switch transitioning from a physical or logical off position to an on position). Alternatively or additionally, the timeout condition is a period of time (e.g., thirty minutes, sixty minutes, etc.). In some examples, the session arbiter 122 is in the manufacture context when the vehicle 102 is manufactured (e.g., the manufacture context is the default context). In manufacture context, the session arbiter 122 tracks a timeout condition. When the timeout condition is satisfied, the session arbiter 122 sets the feature status to enabled. In some such examples, the timeout condition is a threshold distance as measured by, for example, the odometer 108*c*. In such examples, the session arbiter 122 ignores the manufacture context after the feature status is set to enabled. That is, the gateway 112 does not reenter the manufacture context after the feature status is set to enabled.

Figure 2:
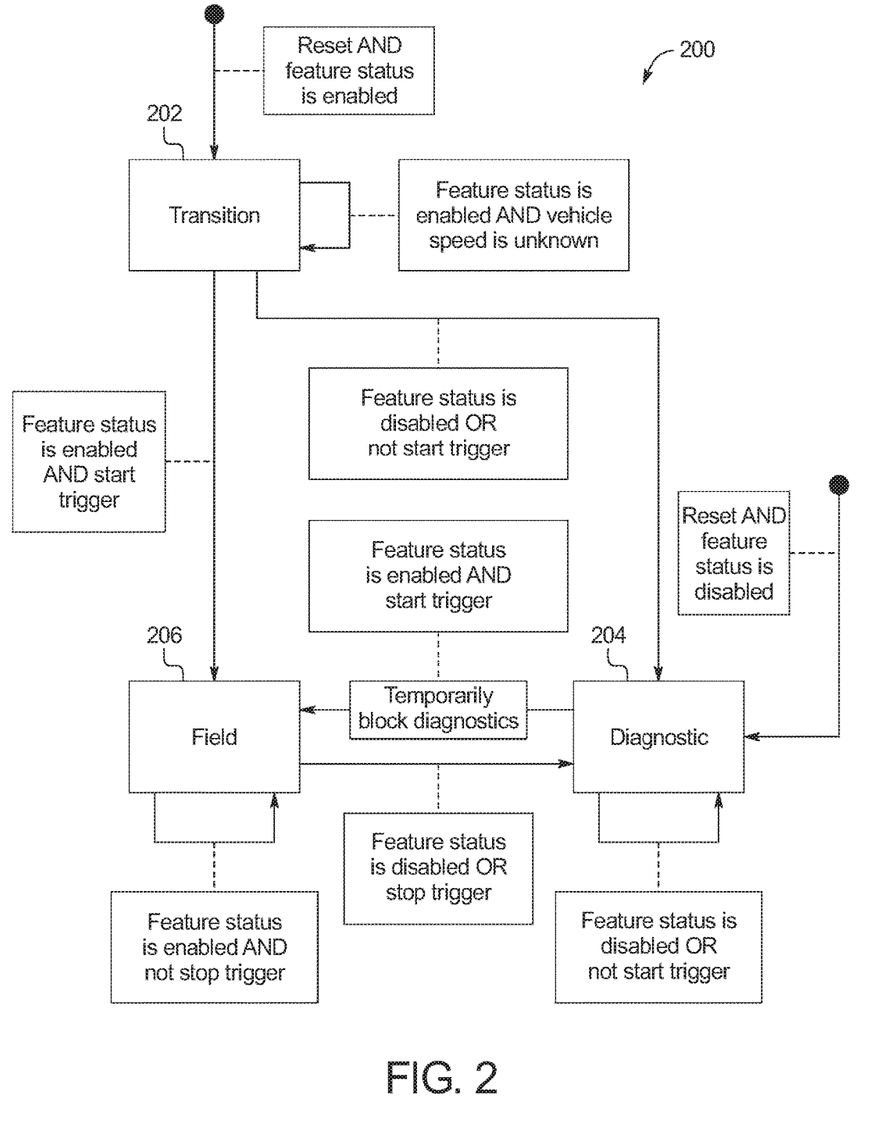
FIG. 2 is a block diagram of a state transition table.

FIG. 2 is a block diagram of a state transition table 200. In the illustrated example, the state transition table 200 includes a transition state 202, a diagnostic state 204, and a field state 206. Initially, when the gateway 112 resets (e.g., the ignition switch is cycled), the session arbiter 122 reads the non-volatile protected memory 124 to determine the feature status of the gateway 112 and thus whether to transition the gateway into the transition state 202 or the diagnostic state 204.

In the transition state 202, the session arbiter 122 blocks sensitive diagnostic requests sent by the TCU 104. The session arbiter 122 remains in the transition state when (a) the feature status of the gateway 112 is enabled (e.g., the value in the non-volatile protected memory 124 is representative of the enabled), and (b) the speed of the vehicle 102 is unknown (e.g., a value has not been received from the speed sensor 108*d*. From the transition state 202, the session arbiter 122 transitions to the field state when (a) the feature status of the gateway 112 is enabled (e.g., the value in the non-volatile protected memory 124 is representative of enabled), and (b) the start trigger is enabled. The session arbiter 122 transitions to the diagnostic state when (a) the feature status of the gateway 112 is disabled (e.g., the value in the non-volatile protected memory 124 is representative of disabled), or (b) the start trigger is not enabled.

In the diagnostic state 204, the session arbiter 122 allows sensitive diagnostic requests sent by the TCU 104 to be forwarded to the requested vehicle data bus 110. The session arbiter 122 remains in the diagnostic state 204 when (a) the feature status is disabled (e.g., value in the non-volatile protected memory 124 is representative of disabled), or (b) the start trigger is disabled. The session arbiter 122 transitions to the field state 206 when (a) the feature status is enabled (e.g., the value in the non-volatile protected memory 124 is representative of enabled), and (b) the start trigger is enabled. When the session arbiter 122 transitions from the diagnostic state 204 to the field state 206, the session arbiter 122 blocks the diagnostic requests from the TCU 104. In such a manner, the session arbiter 122 allows the ECUs 108*a*-108*g* to complete processing any current diagnostic requests and transition to the default session before receiving more diagnostic requests from the TCU 104.

In the field state 206, the session arbiter 122 blocks sensitive diagnostic requests sent by the TCU 104. The session arbiter 122 remains in the field state 206 when (a) the feature status is enabled (e.g., the value in the non-volatile protected memory 124 is representative of enabled), and (b) the stop trigger is disabled. The session arbiter 122 transitions to the diagnostic state 204 when (a) the feature status is disabled (e.g., the value in the non-volatile protected memory 124 is representative of disabled (e.g., the session arbiter 122 has set the value in non-volatile protected memory 124 to represent enabled after a successful authentication handshake), or (b) the stop trigger is enabled.

Figure 3:
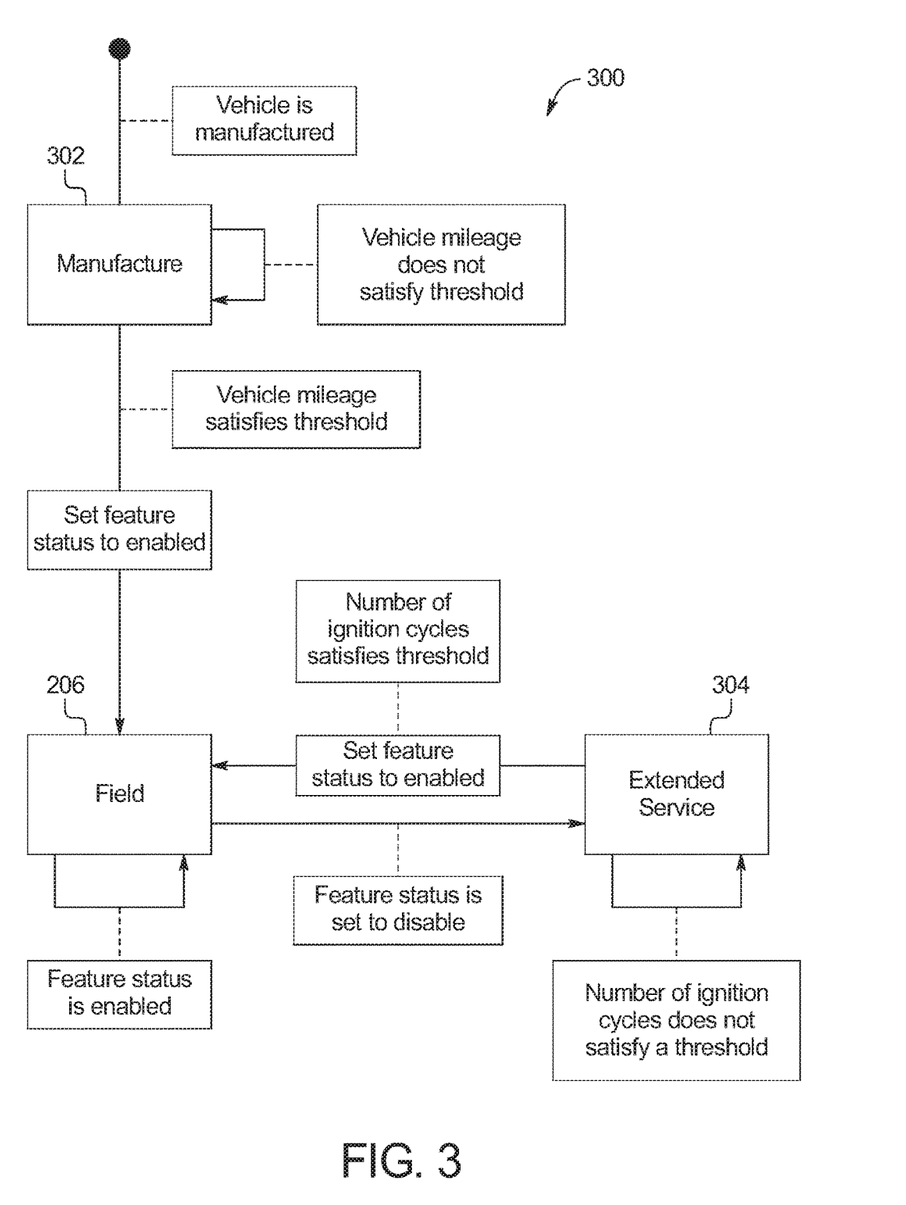
FIG. 3 is a block diagram of a context table.

FIG. 3 is a block diagram of a context table 300. The context table 300 includes an example manufacture context 302, an example extended service context 304, and the field state 206. In the manufacture context 302 and the extended service context 304, the session arbiter 122 does not block diagnostic requests from the TCU 104. In the illustrated example, the session arbiter 122 enters the manufacture context 302 after the vehicle 102 is manufactured. The session arbiter 122 remains in the manufacture context 302 when the mileage (e.g., as measured by the odometer 108*c*) of the vehicle 102 does not satisfy (e.g., is less than) a distance threshold. The session arbiter 122 transitions to the field state 206 when (a) the mileage of the vehicle 102 satisfies (e.g., is greater than or equal to) the distance threshold. In some examples, when the session arbiter 122 transitions from the manufacture context 302 to the field state 206, the session arbiter 122 (a) sets the feature status to enabled (e.g., sets the value indicative of enabled in the non-volatile protected memory) and (b) blocks the diagnostic requests from the TCU 104 for a period of time.

In the illustrated example, the session arbiter 122 transitions into the extended service state when the session arbiter 122 receives a request from, for example, the diagnostic tool to set the feature status to disabled (e.g., after a successful authentication handshake). The session arbiter 122 remains in the extended service context 304 when the number of ignition cycles does not satisfy (e.g., is less than) an ignition cycle threshold. In some examples, the ignition cycle threshold is between two and ten. The session arbiter 122 transitions to the field state 206 when the number of ignition cycles satisfies (e.g., is greater than or equal to) the ignition cycle threshold. In some examples, when the session arbiter 122 transitions from the extended service context 304 to the field state 206, the session arbiter 122 (a) sets the feature status to enabled (e.g., sets the value indicative of enabled in the non-volatile protected memory) and (b) blocks the diagnostic requests from the TCU 104 for the period of time.

Figure 4:
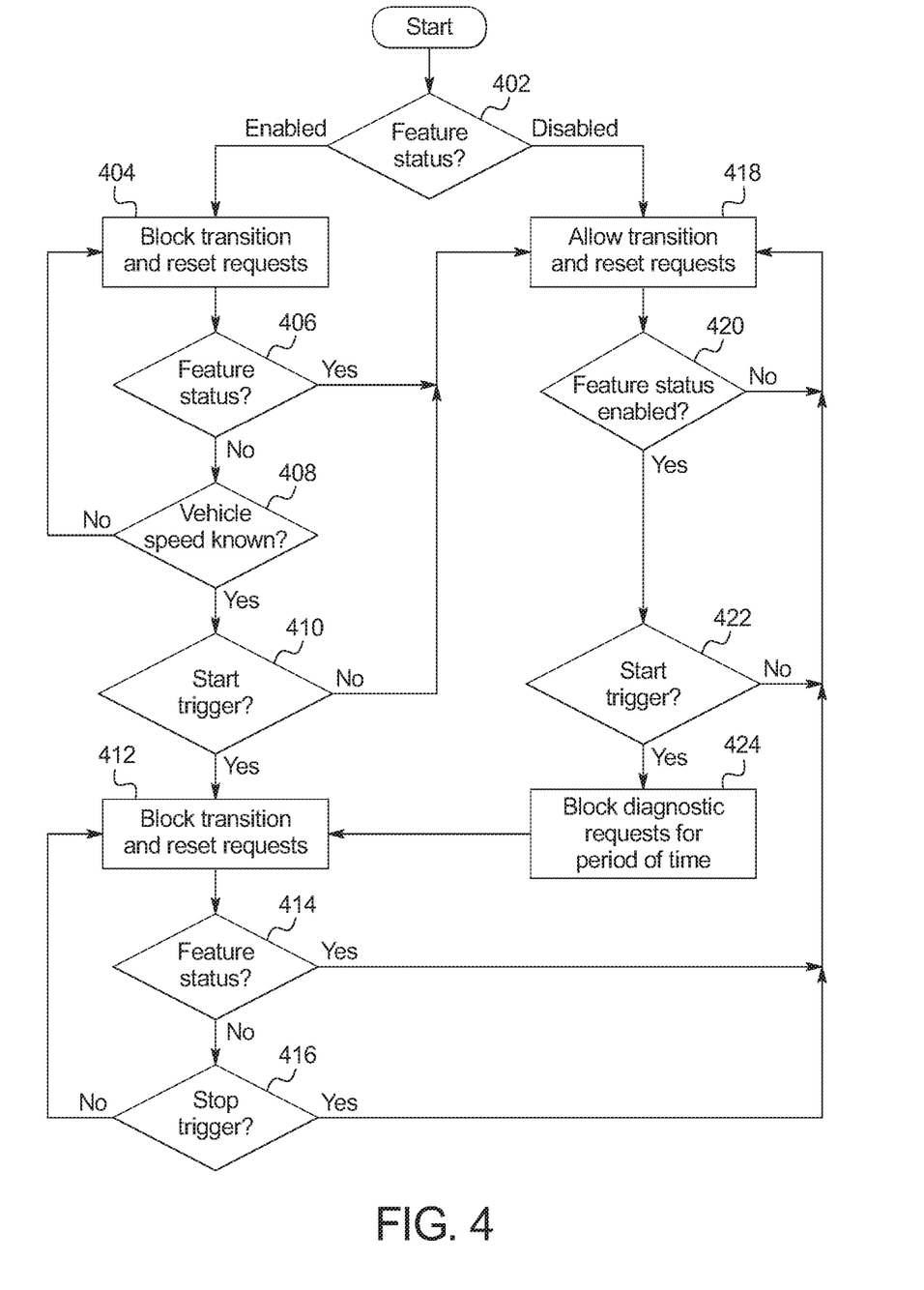
FIG. 4 is a flowchart of an example method to protect the vehicle gateway network of FIG. 1.

FIG. 4 is a flowchart of an example method to protect the vehicle gateway network 100 of FIG. 1. Initially, at block 402, after the gateway resets, the session arbiter 122 determines the feature status of the gateway 112. The value representative of the feature status of the gateway 112 is in is stored in the non-volatile protected memory 124. If the value is representative of enabled, the method continues to block 404. Otherwise, if the value is representative of disabled, the method continues to block 418.

At block 404, the session arbiter 122 blocks session transition requests and reset requests from the TCU 104. At block 406, the session arbiter 122 determines whether the feature status (e.g., value stored in the non-volatile protected memory 124) has changed. If the feature status has changed, the method continues to block 418. Otherwise, if the feature status has not changed, the method continues to block 408. At block 408, the session arbiter 122 determines whether the speed of the vehicle 102 is known. If the speed of the vehicle is known, the method continues to block 410. Otherwise, if the speed of the vehicle is not known, the method returns to block 404. At block 410, the session arbiter 122 determines whether the start trigger is enabled. If the start trigger is enabled, then the method continues to block 412. Otherwise if the start trigger is disabled, the method continues to block 418.

At block 412, the session arbiter 122 blocks session transition requests and reset requests from the TCU 104. At block 414, the session arbiter 122 determines whether feature status has changed. If feature status has changed, the method continues to block 418. Otherwise, if the feature status has not changed, the method continues to block 416. At block 416, the session arbiter 122 determines the status of the stop trigger. If the stop trigger is enabled, the method continues to block 418. Otherwise, if the stop trigger is disabled, the method returns to block 412.

At block 418, the session arbiter 122 allows session transition requests and reset requests from the TCU 104. At block 420, the session arbiter 122 determines the value of the feature status stored in the non-volatile protected memory 124. If the feature status is enabled, the method continues to block 422. Otherwise, if the feature status is disabled, the method returns to block 418. At block 422, the session arbiter 122 determines the status of the start trigger. If the start trigger is enabled, then the method continues to block 424. Otherwise if the start trigger is disabled, the method returns to block 418. At block 424, the session arbiter 122 blocks diagnostic requests from the TCU 104 for a period of time.

The flowchart of FIG. 4 is a method that may be implemented by machine readable instructions that comprise one or more programs that, when executed by a processor (such as the processor 118 of FIG. 1), cause the gateway controller 116 to implement the session arbiter 122 of FIG. 1. Further, although the example program(s) is/are described with reference to the flowcharts illustrated in FIG. 4, many other methods of implementing the example the session arbiter 122 may alternatively be used. For example, the order of execution of the blocks may be changed, and/or some of the blocks described may be changed, eliminated, or combined.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A method to protect a vehicle, the method comprising:
intercepting messages sent by a telematic dongle by a gateway that physically separates the telematic dongle from a vehicle data bus;
when the gateway is in a field state, blocking the messages sent by the telematic dongle to the vehicle data bus that include a first type of request; and
in response to the gateway transitioning to the field state, blocking the messages sent by the telematic dongle to the vehicle data bus that include the first type of request and a second type of request for a period of time.

2. The method of claim 1, including when the gateway is in the field state, allowing messages that include the second type of request sent by the telematic dongle to reach the vehicle data bus.

3. The method of claim 1, wherein states of the gateway include the field state, a transition state, and a diagnostic state.

4. The method of claim 1, including:
in response to power being applied to the gateway, obtaining a feature status value from a non-volatile protected memory;
when the feature status value is indicative of being enabled, transitioning the gateway to a transition state; and
when the feature status value is indicative of being disabled, transitioning the gateway to a diagnostic state.

5. The method of claim 4, wherein when the gateway is in the diagnostic state, allowing messages that include the first type of request and the second type of request sent by the telematic dongle to reach the vehicle data bus.

6. The method of claim 4, including, when the gateway is in the transition state:
monitoring a speed of the vehicle;
when the speed of the vehicle satisfies a threshold, transitioning the gateway to the field state; and
when the speed of the vehicle does not satisfy the threshold, transitioning the gateway to the diagnostic state.

7. The method of claim 4, including when the gateway is in the diagnostic state:
monitoring a speed of the vehicle; and
when the speed of the vehicle satisfies a threshold and the feature status value in the non-volatile protected memory is indicative of the being enabled, transitioning to the gateway to the field state.

8. The method of claim 1, wherein the first type of request cause electronic control units communicatively coupled to the vehicle data bus to reset or transition to a diagnostic session, and wherein the second type of request cause the electronic control units communicatively coupled to the vehicle data bus to report status information.

9. The method of claim 1, including:
storing a value indicative of a setting of a feature status in non-volatile protected memory; and
in response to a request to change the value indicative of the feature status in the non-volatile protected memory to be indicative of a disabled setting:
requesting an authentication token; and
in response to the authentication token being valid, changing the value in the non-volatile protected memory to be indicative of the disabled setting.

10. A system to protect a vehicle, the system comprising:
a gateway in the vehicle electrically connected to a diagnostic port, the gateway physically separating the diagnostic port and a telematic dongle plugged into the diagnostic port from a vehicle data bus, the gateway including non-volatile protected memory and a processor;
the non-volatile protected memory storing a value indicative of a feature status; and
the processor to:
when the gateway is in a field state, block messages that include a first type of diagnostic requests sent by the telematic dongle to electronic control units; and
in response to the gateway transitioning to the field state, block, for a period of time, messages that include the first type of diagnostic requests and a second type of diagnostic requests sent by the telematic dongle to the electronic control units.

11. The system of claim 10, including when the gateway is in the field state, allowing messages that include the second type of diagnostic requests sent by the telematic dongle to reach the electronic control units.

12. The system of claim 10, wherein states of the gateway include the field state, a transition state, and a diagnostic state.

13. The system of claim 10, wherein the processor is to:
in response to power being applied to the gateway, obtain the value of the feature status from the non-volatile protected memory;
when the value of the feature status is indicative of being enabled, transition the gateway to a transition state; and
when the value of the feature status is indicative of being disabled, transition the gateway to a diagnostic state.

14. The system of claim 13, wherein the processor is to, when the gateway is in the diagnostic state, allow the messages that include the first type of diagnostic requests and the messages that include the second type of diagnostic requests sent by the telematic dongle to reach the electronic control units.

15. The system of claim 13, wherein, when the gateway is in the transition state, the processor is to:
monitor a speed of the vehicle;
when the speed of the vehicle satisfies a threshold, transition the gateway to the field state; and
when the speed of the vehicle does not satisfy the threshold, transition the gateway to the diagnostic state.

16. The system of claim 13, wherein when the gateway is in the diagnostic state, the processor is to:
monitor a speed of the vehicle; and
when the speed of the vehicle satisfies a threshold and the value of the feature status is indicative of being enabled, transition the gateway to the field state.

17. The system of claim 10, wherein the first type of diagnostic requests cause the electronic control units communicatively coupled to the vehicle data bus to reset or transition to a diagnostic session, and wherein the second type of diagnostic requests cause the electronic control units communicatively coupled to the vehicle data bus to report status information.

18. The system of claim 10, wherein in response to a request to change the value of the feature status in the non-volatile protected memory to be indicative of a disabled setting, the processor is to:
request an authentication token; and
in response to the authentication token being valid, change the value of the feature status in the non-volatile protected memory to be indicative of a disabled setting.

* * * * *